United States Patent [19]
Murphy

[11] 3,870,225
[45] Mar. 11, 1975

[54] VARIABLE LINEAR GRAPH

[76] Inventor: John E. Murphy, 11 Phyllis Dr., Bethpage, N.Y. 11714

[22] Filed: Apr. 15, 1974

[21] Appl. No.: 461,258

Related U.S. Application Data

[63] Continuation-in-part of Ser. No. 299,829, Oct. 24, 1972, abandoned.

[52] U.S. Cl............................. 235/89 R, 235/61 B
[51] Int. Cl............................................... G06c 3/00
[58] Field of Search ............. 235/89 R, 85 R, 61 B; 116/130, 131, 135

[56] References Cited
UNITED STATES PATENTS

| | | | |
|---|---|---|---|
| 1,074,439 | 9/1913 | Kincaid | 235/89 R |
| 1,087,445 | 2/1914 | Herrick | 235/89 R |
| 2,487,590 | 11/1949 | Rehill | 235/89 R |
| 3,023,956 | 3/1962 | Rondthaler | 235/89 R |
| 3,083,906 | 4/1963 | Giuntini | 235/89 R |

*Primary Examiner*—Stephen J. Tomsky
*Attorney, Agent, or Firm*—Carl Miller

[57] ABSTRACT

A mechanical graph for calculating the linear relationship between two values. The graph includes a rectangular case having orthogonal graph lines thereon, with an origin at a corner of the graph. A pointer is attached at the origin permitting the pointer to swing across the graph surface. The rectangular case includes vertical side portions, at least two of which are orthogonal to each other and include pockets for holding various cards. A first card, designated as an ordinate card, is insertable in one of the side pockets and another card, designated an abscissa card, is insertable in the other side pocket. Each of the cards includes at least one scale thereon, such that the divisions of the scale of the ordinate and abscissa cards correspond respectively to the lines forming the orthogonal graph. The cards can be slidably arranged to have one of the scales thereon adjacent to the edge of the graph whereby the scales on the ordinate and the abscissa cards are utilized to define the divisions on the orthogonal graph.

10 Claims, 6 Drawing Figures

VARIABLE LINEAR GRAPH

This invention is a continuation-in-part of application Ser. No. 299,829, now abandoned filed on Oct. 24, 1972 by the inventor of the present application.

This invention relates generally to a calculating device, and more particularly to a mechanical graph for calculating relationships between two values.

BACKGROUND OF THE INVENTION

Numerous mechanical graphs have been utilized in the prior art for calculating various functions. Most of the graphs are used for specific equations or for specific calculations. Generally, a mechanical graph is set up to carry out a specific mathematical formula or is utilized to provide specific information such as marking embankments in making excavations or determining specific characteristics of electrical wires or mechanical beam structures. Because the prior art mechanical graphs are arranged for particular problems, the degree of versatility of these known graphs is extremely limited. Thus, the known mechanical measuring graphs will utilize a set of fixed scales or a permanently fixed association between the scales and the graph arrangement. As a result, such mechanical graph devices have limited use and are not capable of providing calculations for any given two linearly related values.

It is accordingly an object of the present invention to provide a variable linear graph which avoids the aforementioned problems of prior art devices.

Another object of the present invention is to provide a variable linear graph which is quick and easy to use and which provides accurate results.

A further object of the present invention is to provide a variable linear graph which can be utilized for calculating the relationship between any two linearly related values.

Still a further object of the present invention is to provide a mechanical graph having a fixed orthogonal grid arrangement and having three degrees of variation, namely the values of the orthogonal lines can be independently varied and the linear relationship between the values can also be independently varied.

Another object of the present invention is to provide a variable linear graph having separate and independent ordinate and abscissa scales, whereby the scales can be changed while at the same time retaining a given linear relationship between the two scales.

Yet another object of the present invention is to provide a mechanical graph whereby the ordinate and abscissa scales can be independently varied, whereby the scales can be changed to provide different linear relationships therebetween.

Still a further object of the present invention is to provide a variable linear graph which can be utilized for linear functions having a given constant offset value.

These objects and features are brought about in accordance with the present invention in a variable linear graph including a rectangular case having a horizontal top surface portion and vertical side portions. At least two of said side portions are orthogonally adjacent to each other to establish an ordinate side and an abscissa side. Each of these two side portions includes a respective pocket for retaining scale cards. On the surface portion of the case, there is a first and second set of lines intercepting each other to form an orthogonal graph arrangement of ordinate and abscissa lines having an origin at one corner thereof. The scale cards include at least one ordinate card and one abscissa card, each of the cards including at least one scale thereon. The divisions of the scales on the ordinate and abscissa cards correspond respectively to the ordinate and abscissa lines. The ordinate and abscissa cards are respectively insertable into the side pockets of the ordinate and abscissa sides such that the scales thereon are respectively adjacent to the ordinate and abscissa lines. Each of the ordinate and abscissa cards can be independently varied from each other. A pivot arm is connected at the origin such that it can rotate along the surface of the graph.

The aforementioned objects, together with features and advantages of the invention, will, in part, be pointed out with particularity, and will, in part, become obvious from the following more detailed description of the invention, taken in conjunction with the accompanying drawing which forms an integral part thereof.

BRIEF DESCRIPTION OF THE DRAWING

FIG. 2 is a plan view of a second embodiment of the invention showing the ordinate and abscissa cards visable through transparent edges of the face of the graph.

In the various figures of the drawing, like reference characters designate like parts.

DESCRIPTION OF THE PREFERRED EMBODIMENTS

Figure 1:
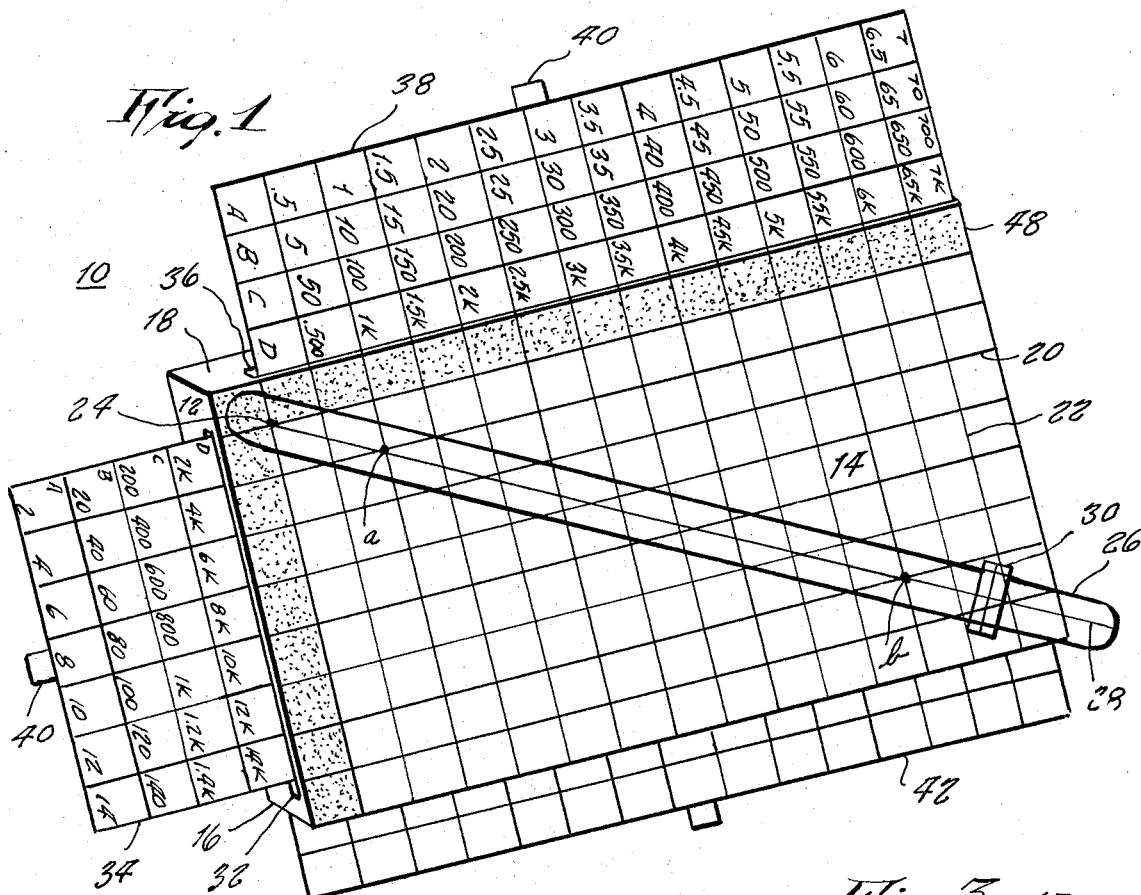
FIG. 1 is a perspective view of the invention showing the ordinate card extending from one pocket, the abscissa card extending from a second pocket, and extra cards contained in a third pocket.
Figure 3:
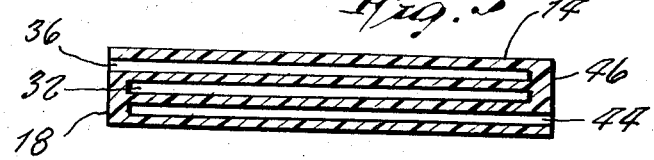
FIG. 3 is a sectional elevational view of the embodiment of FIG. 1 and showing the three pockets.

Referring now to FIGS. 1 and 3, one embodiment of the variable linear graph according to the present invention is shown generally at 10 and includes a case 12 having a top surface portion 14 and side portions 16 and 18. The top surface portion 14 includes an orthogonal graph arrangement including a first set of lines 20, representing the ordinate lines, and a second set of lines 22 intersecting the first set and representing the abscissa lines. At one corner of the graph arrangement, the intersection of the grid lines forms an origin point 24 and includes a hole.

A pointer 26 is securably pivoted in the hole at the orgin point 24 such that it can freely swing across the top surface of the case. The pointer is transparent and includes a hairline 28 as the centerline thereof which is used for making the measurements. A cross-hair arrangement includes a slidable transparent cross-hair piece 30 perpendicular to the pointer 26. The cross-hair piece 30 can be made by wrapping a cellophane around the pointer and including a thin hairline in the cellophane. The cross-hair piece could also be a plastic member having arms which hold the pointer and are retained by a groove and rib arrangement.

The side portion 16 includes a pocket 32 into which there can be inserted an abscissa card 34. Similarly, the side portion 18 includes a pocket 36 into which can be inserted an ordinate card 38. Both the abscissa and the ordinate cards include tab portions 40 which permit slidable insertion and removal of the cards from their respective pockets.

Each of the cards includes at least one scale. The divisions of the scale of each of the cards correspond to the ordinate and abscissa lines, respectively. Thus, as the ordinate scale is inserted into the pocket 36, the lines of the scale will identically match the lines on the graph. Similarly, when the abscissa card is inserted, the scale marking thereon will match identically with the abscissa lines on the graph. In FIG. 1 the numbers on the ordinate card identify the lines immediately under the numbers and the numbers on the abscissa card identify the lines immediately to the right of the numbers. The pockets could be arranged to extend from edge to edge to accommodate larger cards.

Additionally, another side portion 46 could also include a pocket 44 wherein extra cards 42 can be stored. These extra cards can be removed when needed and inserted into the pockets 36 or 32 and utilized as will hereinafter be explained.

It is noted in FIG. 1, that the ordinate card 38 which is partially inserted into the case includes four vertical scales identified as A, B, C and D. Each of these scales includes a plurality of numbers. Each vertical scale is related to the preceding vertical scale by a constant factor. Thus, corresponding values on scale B are ten times greater than those of scale A; corresponding values on scale C are ten times greater than those of scale B; etc. Similarly, the abscissa card 34 is shown as having a number of horizontal scales, four of which are shown extending from the case. The scales are also identified as A, B, C and D. Again, a constant relationship exists between each horizontal scale and the preceding horizontal scale. Thus, the values of scale B are ten times greater than corresponding values of scale A; the values of scale C are ten times greater than the corresponding value of scale B; etc. Generally, the cards would be arranged such that on both the ordinate and the abscissa cards the relationship between the respective scale B and scale A would have the same constant factor. Also, the relationship between the respective scale C and scale B on the ordinate and the abscissa card would have the same constant relationship. Although in both cases shown, the constant factor was the number 10, it is understood that numerous other constant factors could be utilized. Thus, by way of example, scale B of both the ordinate and the abscissa cards could be five times as great as scale A, while scale C could be twenty times as great as scale B. Similarly, many other constant factors could be utilized.

Additionally, it is noted that the increments of each scale form a linear progression. Thus, in scale A of the abscissa card, the increment between each of the values is the number two, forming the sequence 2, 4, 6, 8, . . . In scale A of the ordinate scale card, the incremental value of the numbers of scale A is .5. Thus, the sequence is formed .5, 1, 1.5, 2, etc. It can therefore be seen that the relationship of the incremental values between scale A of the ordinate scale and scale A of the abscissa scale is also a constant factor.

The variable linear graph of the present invention can be utilized in numerous ways. For example, assume that the scale is to be utilized to convert money from pounds sterling to U.S. dollars. Assume further that the conversion rate is 1 pound sterling equals $2.20. This relationship is in the form of the mathematical equation $X = mY$, wherein $Y =$ pounds; $X =$ dollars, and $m = 2.2$. The abscissa card representing dollars would be pulled out to scale A, and similarly the ordinate card representing pounds would be pulled out to scale A. The pointer would then be set such that it intersects at point $a$, which represents 1 pound sterling (1 on the A ordinate axis) and $2.20 (2.2 on the A abscissa axis).

Assume now that the user wants to know how many pounds will equal $12.00. Retaining the pointer in the same place, the user will read on the A abscissa scale the number 12 and where it intersects the hairline of the pointer at point $b$ he will read across onto the A ordinate scale, the value of 5.5 representing 5.5 pounds sterling.

If, on the other hand, the user wanted to know how many pounds there were in $120.00, he would pull out the abscissa scale to the B scale and at the same time pull out the ordinate scale to the B scale. While retaining the pointer at the same position, he could then read at point $b$ the value 120 and determine that it intersects 55 pounds on the B ordinate scale.

The mathematical reasoning which justifies this measurement is as follows. In the formula $X = mY$, if both sides of the equation were multiplied by a constant K, there would be obtained the formula $KX = mKY$. As long as both sides of the equation are multiplied by the same constant factor, the identical linear relationship exists. Since the respective relationship between scales A & B have the same constant factor relationship between them on both the ordinate and the abscissa cards, the user need only make sure that he is using the same lettered scale on both the ordinate and abscissa cards and he need not change the position of the pointer.

The variable linear graph can also be utilized to obtain solutions by using more than one scale for the same measurement. Thus, by way of example, if the user desires to know how many pounds there are in $126.00, he would first use scale B on both the ordinate and abscissa cards, and read out 55 pounds corresponding to $120.00. While retaining the pointer fixed, he would then move both cards to their respective A scales, and read out $6.00 corresponding to 2.75 pounds. The total number of pounds in $126.00, would therefore be the combination of the two values, namely 57.75 pounds.

It is therefore observed that as long as the abscissa and ordinate cards both contain the same lettered scale, it is not necessary to vary the pointer. The pointer can be held to identify the desired linear relationship, and the scales can be varied, so long as the same lettered scale on both the ordinate and the abscissa cards is being utilized.

Since the ordinate and the abscissa card can be varied independently of each other, it is also possible to utilize the present invention wherein different lettered scales are respectively used for the ordinate and the abscissa cards. Thus, by way of example, if the formula to be solved is $X = 220Y$, in order to obtain a more accurate reading it might be better to use a combination of different lettered scales. Thus, when determining the value of $Y$ when $X$ equals 1,200, it would be better to utilize scale D on the abscissa card and scale A on the ordinate card. This would obtain more accurate reading wherein the value of Y can be seen as 5.5. In so doing, the pointer would represent this specific linear relationship. If the user then decides to change one of the cards independently of the other, for example, should he desire to switch the ordinate card from scale A to scale B while retaining the abscissa card at scale D, he would of course, have to change the position of the pointer to reflect the new slope. However, since each of the cards can be independently varied, there is obtained an additional freedom of measurement by varying one of the cards and thereby measurements can be obtained more accurately. Thus, the three degrees of freedom of measurement which can be obtained with the present invention include the variation of the two cards independently of each other, and the variation of the slope of the pointer independently of the two cards.

In FIG. 1, the outermost edges 48 along the ordinate and abscissa sides, are shown as being stippled to indicate different coloring, or tone or quality of surface. This difference is to show that the edge portions are not part of the orthogonal graph itself. The difference in surface would remind the user that the graph starts at the origin and does not include the outermost edge area 48 of the top surface. The outer edges would contain extensions of the orthogonal graph lines. The purpose of the outer edges are to help align the lines on the cards with the lines on the graph. However, since the cards do not extend to the edge of the case, the outer edges are not used as part of the graph. If the cards do extend to the edge and the origin were removed to the actual corner of the case, the outer edges 48 could then be utilized as part of the graph arrangement itself, and no differences in the surface would have to be provided.

Referring now to FIG. 2, it is possible to form the graph on the surface of the case utilizing transparent material for the outer edge area 50 along the ordinate side and the outer edge area 52 along the abscissa side. These areas would not be part of the orthogonal graph itself. The rest of the surface which does form the graph, could be of a different color or opacity. Thus, when the ordinate and abscissa cards are slipped in and out of the case, the scales on the cards which are being utilized would appear through the transparent section of the top surface and would directly align against the graph portion. Thus, in the embodiment shown in FIG. 2, the ordinate scale being utilized is scale D which is read through the transparent section 50 and the abscissa scale C is being read through the transparent section 52. The section 54 represents the graph itself. The origin 55 is shown at the corner of the graph and includes the hole to pivot the pointer.

It is noted that in FIG. 2, the numbers on the scales of the ordinate care identify the lines located below the numbers. The numbers on the scales of the abscissa cards identify the lines located on the left of the numbers.

Figure 4:
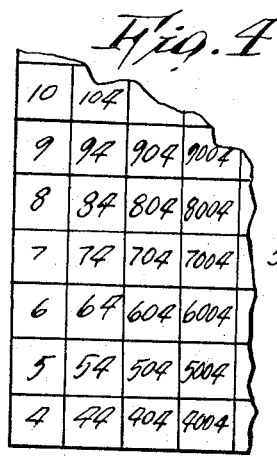
FIG. 4 is a fragmentary face view of one of the ordinate cards and is useful in explaining the calculation of equations of the form $Y = mX + b$.
Figure 5:
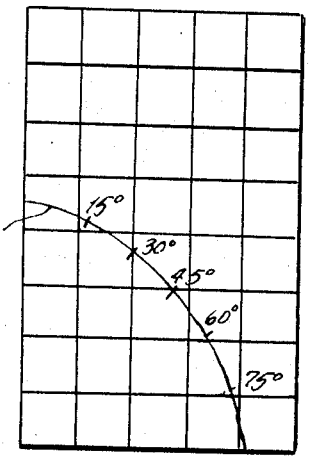
FIG. 5 is a plan view of a graph face and including an angular scale.
Figure 6:
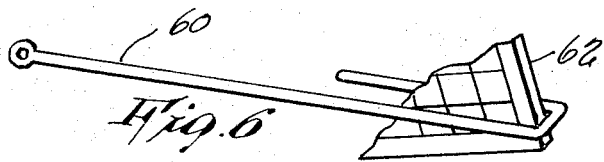

Although the variable relationships heretofore presented by way of example have all been of the form $Y = mX$, it is also possible to utilize the present invention with an equation of the form $Y = mX + b$. The constant value b represents an offset and can be accommodated by having the scales start from the offset value and linearly increase from that value. Thus, as is shown in FIG. 4, the constant offset $b$ can be the number 4 and the scales on ordinate card shown would start from the offset value 4. In this way, equations having an added constant as part of the functional relationship could also be measured and calculated using the present invention.

The linear graph of the present invention could also be utilized for calculations requiring angular measurement, by including an angular scale 58 on the surface of the graph portion having thereon a number of identified angular positions.

The graph could be designed with the spaced apart lines being of different colors to provide for easier reading. Blank cards could also be included to permit the user to write on any given scale that he desired for his particular use. This invention could also be either made in pocket size, or as large as desired, depending upon the use needed. The larger the size, the easier it would be to read and the more accurate the answer. The pocket size could be of course made with a cover that snaps or ties closed to protect the pointer and the surface of the device.

Although the examples heretofore given were in connection with conversion of money, it is understood that the present invention could be utilized for numerous types of linear mathematical calcuations including the determination of distance traveled by an object respective to time, the voltage for different current values flowing through a fixed resistor, vector and geometry calculations, measurements, and many other types of calculations. This device could be used in a classroom on a blackboard or it could be carried by a traveler in his pocket.

Figure 6:
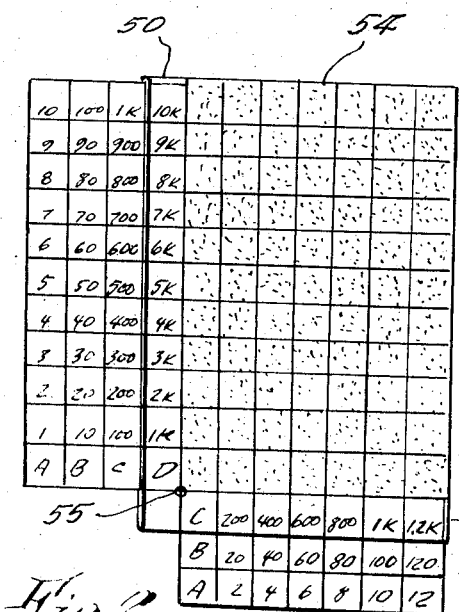
FIG. 6 is a fragmentary perspective view of a modified design of the invention in which the pointer comprises a thin wire bent around the rear of the face of the graph.

Referring to FIG. 6, there is shown another embodiment of the pointer 60, which could be made out of a stiff thin wire passing around the edge of the graph surface 62 to insure that it remains on the surface and prevents the possiblity of having the pointer bent or removed from the top of the surface.

There has been disclosed heretofore the best embodiments of the invention presently contemplated. However, it is to be understood that various changes and modifications may be made thereto without departing from the spirit of the invention

What is claimed is:

1. In a variable linear graph, the combination of rectangular case means having a horizontal top surface portion and vertical side portions, at least two of said side portions being orthogonally adjacent to each other thereby establishing an ordinate side and an abscissa side, each of said two side protions containing therein pocket means, on said surface portion there being first and second sets of lines intersecting each other to form an orthogonal graph arrangement of ordinate and abscissa lines having an origin at one corner thereof, at least one each of an ordinate card and an abscissa card, each of said cards respectively including at least one scale thereon, the divisions of the scale of said ordinate and abscissa cards corresponding respectively to said ordinate and abscissa lines, said ordinate and abscissa cards being independently insertable into said respective pocket means of said ordinate and abscissa side portions such that the scales thereon are respectively adjacent to said ordinate and abscissa lines, and arm means pivotally attaahed to the surface of said case means at said origin of said graph to rotate on said graph.

2. The combination of claim 1 and wherein said ordinate card and said abscissa card each contain a corresponding plurality of scales, the values of corresponding scales on said respective ordinate and abscissa cards having an identical constant relationship to the values of corresponding respective preceding scales, the values within said corresponding scales each forming a linear progression and wherein said linear progressions of said corresponding scales are related to each other by a constant factor.

3. The combination of claim 1 and wherein a third vertical side portion of said case means also contains a pocket means for storing extra ones of said ordinate and abscissa cards.

4. The combination of claim 1 and wherein said ordinate and abscissa cards each contain tab means for facilitating insertion and removal of said cards from their respective pocket means.

5. The combination of claim 1 and wherein said origin is spaced from the vertical side portions.

6. The combination of claim 1 and wherein the areas adjacent the edges of said top surface portion include extensions of said sets of lines which do not form part of said graph arrangement.

7. The combination of claim 1 and wherein said surface portion includes transparent sections along the edges thereof surrounding the graph arrangement.

8. The combination of claim 1 and wherein said first and second sets of lines are each of different colors.

9. The combination of claim 1 and wherein said arm means includes a first hairline along the length thereof and a slidable hairline transverse to said first hairline.

10. The combination of claim 1 and wherein said graph arrangement further includes an angular scale arrangement.

* * * * *